(12) United States Patent
Krasser et al.

(10) Patent No.: US 8,719,939 B2
(45) Date of Patent: May 6, 2014

(54) MALWARE DETECTION VIA REPUTATION SYSTEM

(75) Inventors: Sven Krasser, Atlanta, GA (US);
Yuchun Tang, Johns Creek, GA (US);
Yuanchen He, Johns Creek, GA (US);
Zhenyu Zhong, Alpharetta, GA (US)

(73) Assignee: McAfee, Inc., Santa Clara, CA (US)

( * ) Notice: Subject to any disclaimer, the term of this patent is extended or adjusted under 35 U.S.C. 154(b) by 325 days.

(21) Appl. No.: 12/693,765

(22) Filed: Jan. 26, 2010

(65) Prior Publication Data
US 2011/0162070 A1 Jun. 30, 2011

Related U.S. Application Data

(60) Provisional application No. 61/291,568, filed on Dec. 31, 2009.

(51) Int. Cl.
H04L 29/06 (2006.01)

(52) U.S. Cl.
USPC .......................................................... 726/24

(58) Field of Classification Search
USPC ............................................. 726/24–25, 22
See application file for complete search history.

(56) References Cited

U.S. PATENT DOCUMENTS

| | | |
|---|---|---|
| 6,697,948 B1 | 2/2004 | Rabin |
| 6,708,212 B2 | 3/2004 | Porras et al. |
| 6,981,155 B1 | 12/2005 | Lyle et al. |
| 7,095,716 B1 | 8/2006 | Ke et al. |
| 7,409,712 B1 | 8/2008 | Brooks et al. |
| 7,512,977 B2 | 3/2009 | Cook et al. |
| 7,752,667 B2 | 7/2010 | Challener et al. |
| 7,945,787 B2 | 5/2011 | Gassoway |
| 2004/0042416 A1 | 3/2004 | Ngo et al. |
| 2004/0054925 A1 | 3/2004 | Etheridge et al. |
| 2004/0073810 A1* | 4/2004 | Dettinger et al. ............. 713/201 |
| 2004/0123117 A1 | 6/2004 | Berger |
| 2004/0203589 A1 | 10/2004 | Wang et al. |
| 2005/0015455 A1 | 1/2005 | Liu |
| 2005/0027818 A1 | 2/2005 | Friedman et al. |
| 2005/0065899 A1 | 3/2005 | Cong et al. |
| 2005/0262576 A1 | 11/2005 | Gassoway |
| 2006/0036693 A1 | 2/2006 | Hulten et al. |
| 2006/0070130 A1 | 3/2006 | Costea et al. |

(Continued)

FOREIGN PATENT DOCUMENTS

| | | |
|---|---|---|
| WO | 2008089626 A1 | 7/2008 |
| WO | WO-201182084 A3 | 7/2011 |
| WO | WO-2011082084 A2 | 7/2011 |

OTHER PUBLICATIONS

International Application Serial No. PCT/US2010/061889, Search Report mailed Aug. 29, 2011, 3 pgs.

(Continued)

Primary Examiner — Edward Zee
(74) Attorney, Agent, or Firm — Wong, Cabello, Lutsch, Rutherford & Brucculeri, LLP

(57) ABSTRACT

A computer network device receives a digital file and extracts a plurality of high level features from the file. The plurality of high level features are evaluated using a classifier to determine whether the file is benign or malicious. The file is forwarded to a requesting computer if the file is determined to be benign, and blocked if the file is determined to be malicious.

25 Claims, 2 Drawing Sheets

(56) References Cited

U.S. PATENT DOCUMENTS

| | | | |
|---|---|---|---|
| 2006/0150256 | A1 | 7/2006 | Fanton et al. |
| 2006/0242245 | A1* | 10/2006 | Christensen ............... 709/206 |
| 2007/0016953 | A1 | 1/2007 | Morris et al. |
| 2007/0028304 | A1* | 2/2007 | Brennan ..................... 726/24 |
| 2007/0073660 | A1* | 3/2007 | Quinlan ....................... 707/3 |
| 2007/0079379 | A1 | 4/2007 | Sprosts et al. |
| 2007/0226804 | A1 | 9/2007 | Somkiran et al. |
| 2007/0240217 | A1 | 10/2007 | Tuvell et al. |
| 2007/0240220 | A1 | 10/2007 | Tuvell et al. |
| 2007/0261112 | A1 | 11/2007 | Todd et al. |
| 2008/0126779 | A1 | 5/2008 | Smith |
| 2008/0141373 | A1 | 6/2008 | Fossen et al. |
| 2008/0168533 | A1 | 7/2008 | Ozaki et al. |
| 2008/0196099 | A1 | 8/2008 | Shastri |
| 2008/0295177 | A1 | 11/2008 | Dettinger et al. |
| 2008/0313738 | A1* | 12/2008 | Enderby ...................... 726/24 |
| 2009/0044024 | A1* | 2/2009 | Oberheide et al. ........... 713/188 |
| 2009/0064329 | A1 | 3/2009 | Okumura et al. |
| 2009/0088133 | A1 | 4/2009 | Orlassino |
| 2009/0097661 | A1 | 4/2009 | Orsini et al. |
| 2009/0254992 | A1* | 10/2009 | Schultz et al. ................ 726/24 |
| 2010/0031358 | A1 | 2/2010 | Elovici et al. |
| 2011/0047618 | A1* | 2/2011 | Evans et al. .................. 726/23 |
| 2011/0138465 | A1 | 6/2011 | Franklin et al. |
| 2013/0276106 | A1 | 10/2013 | Barton et al. |

OTHER PUBLICATIONS

International Application Serial No. PCT/US2010/061889, Written Opinion mailed Aug. 29, 2011, 3 pgs.
An Architecture for Generating Semantics-Aware Signatures; Vinod Yegneswaran, Jonathon T. Griffin, Paul Barford, Somesh Jha; Appeared in Proceedings of Usenix Security Symposium 2005, all pages.
Christodorescu, Miha et al. "Testing Malware Detectors" In the Proceedings of the ACM SIGSOFT International Symposium on Software Testing and Analysis (ISSTA '04), vol. 29, Issue 4, Jul. 11-14, 2004, Boston, Massachusetts, 11 pages.
VMware DiskMount Utility: User's Manual, http://www.vmware.com/pdf/VMwareDiskMount.pdf, 1998-2005, Revision Apr. 8, 2005, Vmware, Inc., 6 pages.
Wolf, Chris, Column: "Virtual Server 2005 R2 SPI Treasures: VHD Mount", Jun. 2007, Microsoft Certified Professional Magazine Online, Download on Feb. 27, 2008 from http://mcpmag.com/columns/article.asp?EditorialsID=1793 pp. 1-5.
"Chroot(2)—Linux man page", Downloaded on Feb. 27, 2008 from http://linux.die.net/man/2/chroot pp. 1-2 D.
"Linux/Unix Command: chroot", Downloaded on Feb. 27, 2008 from http://linux.about.com/library/cmd/blcmdl2_chroot.htm pp. 1-3.
"Blacklist", Wikipedia, last modified Jun. 5, 2008, Wikipedia Foundation, Inc. Downloaded from http://en.wikipedia.org/wiki/Blacklist, pp. 1-3.
U.S. Appl. No. 11/946,777, filed Nov. 28, 2007.
Non-Final Office Action, dated Jan. 5, 2011 for U.S. Appl. No. 11/946,777.
Final Office Action, dated Jun. 13, 2011 for U.S. Appl. No. 11/946,777.
Final Office Action, dated Dec. 29, 2011 for U.S. Appl. No. 11/946,777.
U.S. Appl. No. 12/111,846, filed Apr. 29, 2008.
Non-Final Office Action, dated Jun. 24, 2011 for U.S. Appl. No. 12/111,846.
Final Office Action, dated Nov. 15, 2011 for U.S. Appl. No. 12/111,846.
Final Office Action, dated Jun. 18, 2012 for U.S. Appl. No. 12/111,846.
U.S. Appl. No. 12/050,432, filed Mar. 18, 2008.
Non-Final Office Action dated Oct. 6, 2010 for U.S. Appl. No. 12/050,432.
Final Office Action dated May 13, 2011 for U.S. Appl. No. 12/050,432.
Non-Final Office Action dated Mar. 12, 2012 for U.S. Appl. No. 12/050,432.
Final Office Action dated Jun. 21, 2012 for U.S. Appl. No. 12/050,432.
U.S. Appl. No. 12/131,383, filed Jun. 2, 2008.
Non-Final Office Action dated Jun. 24, 2011 for U.S. Appl. No. 12/131,383.
Final Office Action dated Oct. 17, 2011 for U.S. Appl. No. 12/131,383.
Non-Final Office Action dated Mar. 6, 2012 for U.S. Appl. No. 12/131,383.
Final Office Action dated Jun. 28, 2012 for U.S. Appl. No. 12/131,383.
U.S. Appl. No. 12/144,967, filed Jun. 24, 2008.
Non-Final Office Action dated Mar. 3, 2011 for U.S. Appl. No. 12/144,967.
Final Office Action dated Aug. 17, 2011 for U.S. Appl. No. 12/144,967.
Non-Final Office Action dated Mar. 15, 2012 for U.S. Appl. No. 12/144,967.
U.S. Appl. No. 12/398,073 filed Mar. 4, 2009.
Non-Final Office Action dated Oct. 4, 2011 for U.S. Appl. No. 12/398,073.
Final Office Action dated Apr. 12, 2012 for U.S. Appl. No. 12/398,073.
Advisory Action dated Jun. 5, 2012 for U.S. Appl. No. 12/398,073.
International Preliminary Report received for PCT Patent Application No. PCT/US2010/061889, issued on Jul. 4, 2012, 4 pages.
Office Action received for Korean Patent Application No. 1020127020220, mailed on Sep. 23, 2013, 15 pages of Office Action Including 5 pages of English Translation.
Notice of Allowance received for U.S. Appl. No. 12/398,073, mailed on Aug. 30, 2013, 10 Pages.
U.S. Appl. No. 12/050,432, filed on Mar. 18, 2008.
Office Action received for Australian Patent Application No. 2010336989, mailed on Jun. 21, 2013, 3 pages.
Office Action received for U.S. Appl. No. 12/398,073, mailed on Feb. 15, 2013.
Notice of Allowance received for U.S. Appl. No. 12/398,073, mailed on Jun. 24, 2013.

\* cited by examiner

MALWARE DETECTION VIA REPUTATION SYSTEM

RELATED APPLICATION

This patent application claims the priority benefit of U.S. Provisional Application Ser. No. 61/291,568 filed Dec. 31, 2009 and entitled "MALWARE DETECTION VIA REPUTATION SYSTEM", the content of which is incorporated herein by reference in its entirety.

FIELD OF THE INVENTION

The invention relates generally to detecting malicious program code in a computerized system, and more specifically to malware detection via a reputation system.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or criminals to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. A variety of other malware, such as adware, spyware, and Trojan horse programs are commonly detected and controlled via protective systems such as these.

Many such protective systems use signatures of known malware threats to detect and control the threat. For example, antivirus software typically uses a large library of signatures comprising code segments or other identifying information to scan storage such as hard drives and to scan executing programs, removing offending code from the computer system before it can cause damage.

Detection of new threats, or threats that are capable of rearranging their executable code to reduce the effectiveness of signature-based detection remains a challenge for antmalware applications. Given that new types of malware are constantly being developed, and are often configured to avoid detection, efficient and accurate detection of malware remains an ongoing challenge for malware detection software.

SUMMARY

Some example embodiments of the invention comprise a computer network device that is operable to receive a digital file and extract a plurality of high level features from the file. The plurality of high level features are evaluated using a classifier to determine whether the file is benign or malicious. The file is forwarded to a requesting computer if the file is determined to be benign, and blocked if the file is determined to be malicious. Elements of the invention can be employed in gateway devices such as firewalls, or on endhosts to prevent accessing malicious files. In a further example, a backend malware analysis platform is employed to detect and track malicious files.

DETAILED DESCRIPTION

Figure 1:
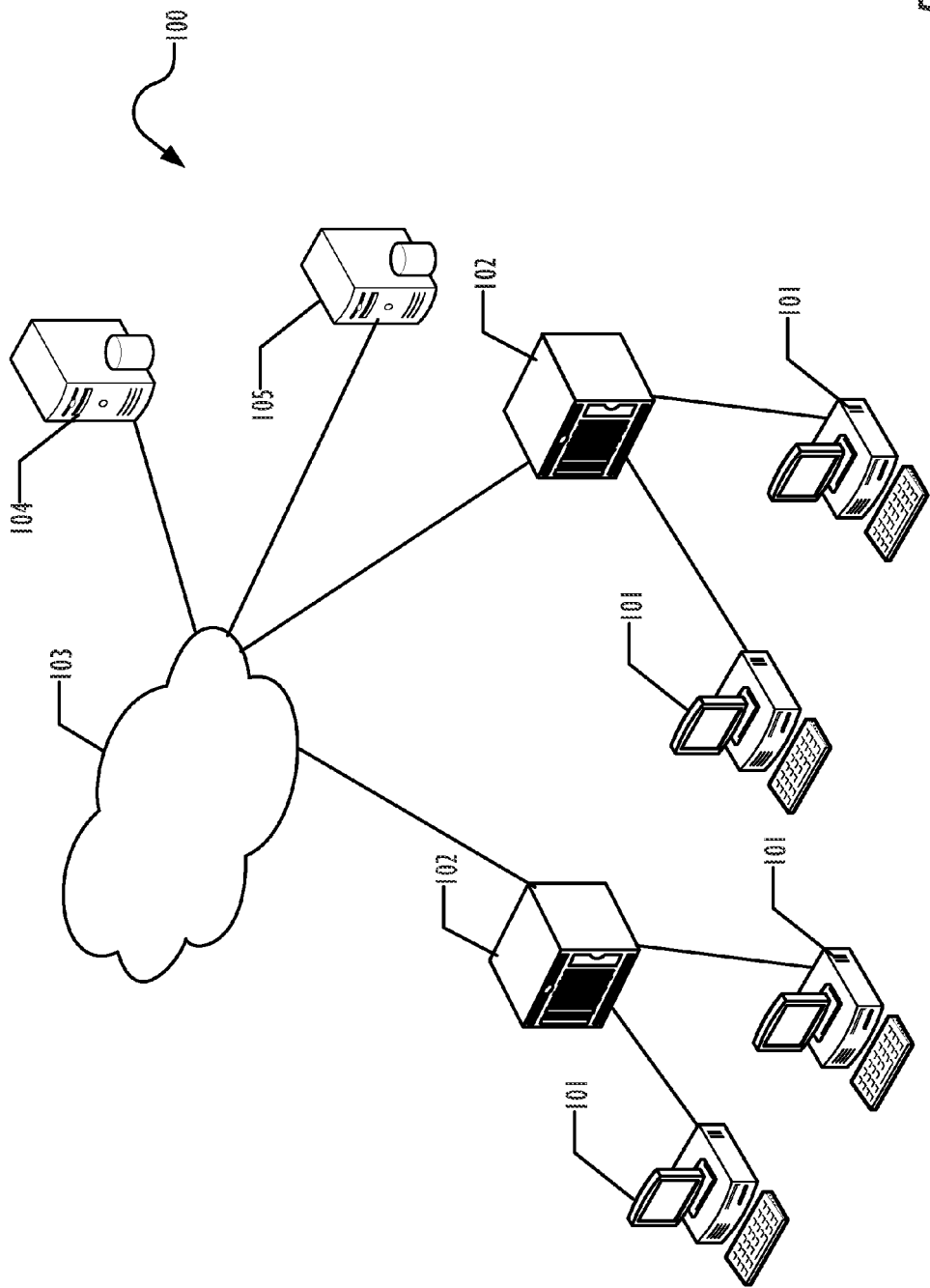
FIG. 1 shows a computer network, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Some example embodiments of the invention comprise classification of an electronic binary file such as an executable program using high-level characteristics of the file and a decision tree, producing an efficient and accurate determination as to the likelihood of the file being malware.

Because malware detection using signatures alone is becoming less effective as malware producers design programs to avoid detection, other methods are desired to improve detection rates of programs that perform undesirable functions. To help boost malware detection rates, techniques are implemented in some embodiments of the invention that go beyond signatures or other low-level features of software that includes or is infected with malware.

Files can be handled or represented in at least three different ways in different embodiments, including using the file itself, using a hash of the file, or using high level characteristics of the file. Research has shown that high-level features can be successfully used to detect malicious behavior in a more detailed generalized malware detection system example, by using an extractor program to extract high-level features from binaries. Such features include file size information, entropy, timestamps, dynamically linked libraries, and other such high-level characteristics. While each of these features are not conclusive by themselves of maliciousness of a binary, a combination of all features can yield an accurate result to label a particular sample as clean or dirty.

Several techniques are used to work at different tiers of malware detection to provide more efficient and effective recognition of malware in various embodiments, including a compact and fast classifier for endhost deployment, a compact and fast classifier for gateway deployment, a complex classifier for backend sample processing, and a complex and fast classifier suitable for real-time classification of queries.

Using an extractor, a binary file is dissected into different features or properties of the file, including static properties that can be easily extracted as well as behavioral data such as network activity or libraries or other resources used. Also, features can be dense (always present, e.g. the file size) or sparse (rarely present, e.g. the first two bytes at the entry point are xyzz).

The high level features of the file include in various embodiments features such as file size, randomness within the file, a starting or ending code string in the file, and file geometry. File geometry includes not only size, but other characteristics such as the number of sections in a file, organization of the sections, inclusion and characteristics of executable code sections, etc. For example, a file having five sections in which the last section is executable code having high entropy or randomness can be reasonably guessed to be malicious code hiding within a file having other content.

To distinguish clean binaries from malware, a data set of clean and dirty samples is built. Using these, machine learning algorithms are employed to derive a boundary in the feature space to separate clean from dirty samples. Various implementations include use of compact models such as a decision tree to evaluate data and conversion of sparse features into dense features to form an endpoint, gateway, or backend classification system.

In certain deployments, a small classification model is desirable, such as implementation on an end user computer system or portable device. Standard techniques can result in large models and are therefore not practical. In one such example, a small model file is produced with a moderate false positive rate. Files detected as malware are looked up against a network server to determine whether they are actually malware, such that the server makes the final malware determination.

When a compact model is required, we use a decision tree classifier that we express as a series of nested if statements. We prune all paths that do not result in a malicious classification result and default to clean/unknown in that case. Furthermore, we transform all sparse features in the input data into dense features, reducing the model size drastically by just slightly affecting the classification performance.

Transformation of sparse features into dense features enables use of a smaller number of decisions in the decision tree. Instead of using several thousand separate features, we use the feature id to look up a number of dense features instead. We use a hash implementation along with a compressed bitmask to store the hash data in a very efficient fashion, resulting in fast lookups and a small memory footprint. For example, starting bits, end bits, and other such features of a file can be converted to one or more hash values, and compared to hash values of known bad files.

In another example, a moderately sized model having a lower false positive rate is employed, such as on an endhost or gateway device. Files identified as being potentially malicious are queried against a whitelist of known good files, stored on a server or cached and updated locally, to further reduce the false positive rate.

A larger model can further reduce false positive rates in some embodiments, such as by using a relatively large lookup file locally, and not querying a server for additional information or confirmation. Such a model can be useful where sufficient computing resources are available on the endhost, or when networked lookup services are unavailable or sporadic.

These models can be used for endpoint, gateway, backend, or cloud classification. Using a compact model and sparse feature transformation, a model is calculated for endpoint classification, such as one having tens of thousands of model elements in the decision tree. Generally the false positive rate allows the use of this model as a query selector for cloud or network lookups, but higher certainly levels are possible. The technique can also be used in conjunction with a whitelist provided by a data server for proactive reduction of false positives. Lastly, classifiers can be biased to avoid hitting on popular files, further including using the data server for information on file proliferation in some embodiments.

Although a small machine using endpoint detection that sees mostly good files will desirably have a low false positive rate in addition to a small and efficient classification model, a higher false positive rate can be tolerated and may be desirable to avoid missing malicious files in a gateway or other device that sees a much higher percentage of malicious files. Using a compact model and sparse feature transformation, one example gateway model is calculated to have a false positive rate in the order of 0.1%, which is suitable as a gateway classifier but perhaps higher than is desirable for endpoint classification.

More complex features can be extracted and higher dimensionality such as sparse features can be tolerated in backend classification, where a system such as a data server is used to evaluate unknown files or files that meet certain criteria in other classification points. Larger models on the order of tens or hundreds of megabytes of data can be applied to data files quickly and efficiently using the additional processing power available in a dedicated backend system.

In cloud classification, the data provided to a backend data server for lookup can be used to classify data on the fly as features are extracted and sent to a dedicated server for classification. Input features are similar to endpoint classification, but model files can be larger. Furthermore, we can integrate additional global information such as distribution of samples based on IP address, level of proliferation, bursts of lookups, etc. Lastly, this data can be consolidated with email or Web reputation lookups allowing us to learn about new outbreaks in emails and on the Web and responding in real-time, similar to how phishing emails and URLs are handles with respect to email and Web reputation.

FIG. 1 shows a networked computing environment including high-level feature data classification in a number of embodiments, consistent with an example embodiment of the invention. Here, a variety of end user computer systems 101 are connected via gateways 102 to a network such as the Internet, at 103. The computers are able to connect to external computer systems such as 105, which may provide content that is benign or that is harmful. A data server 104 is provided in some further embodiments, providing backend or cloud classification and reputation server functionality.

In operation, a user of a computerized device 101 such as a personal computer or "smart" phone coupled to the Internet requests a file from a remote computer system 105. The requested data travels through the Internet 103 and a gateway 102 such as a firewall before reaching the end user. A high-level analysis is performed on characteristics of the file, such as file geometry, randomness, size, starting code string, and other such features.

Classification of the file as benign or malware is performed at various stages in various embodiments of the invention, such as at the end user's computer system 101 in end user classification such that the file is scanned before it can be executed or opened. Gateway classification at the gateway 102 can prevent the file from reaching the end user if it is determined to be malicious, and the gateway or another system can rely on the data server 104 to perform cloud classification, such as where the file is borderline, or where a gateway or end user classification is not provided. Cloud classification provides for classification using distributed computer systems, such as multiple servers 104 to more efficiently evaluate new or unknown threats. In a further embodiment, backend classification of new or unknown files us used to determine that a file being analyzed is malicious, and to provide information such as signature and hash data to the gateway 102 and cloud servers 104 to aid in future detection of the threat.

More detailed deployment examples for the environment of FIG. 1 include deploying the malware detection engine on the end host 101 using one of the various deployment models discussed previously, deployment on the gateway 102, use of a reputation server 104 to classify features sent by endhosts, and backend system detection of malicious files in a large corpus along with subsequent characterization of file information such as signature generation. In these examples, the reputation server and backend system detection differ in that the reputation server exists to provide customer lookup responses, while the backend detection system is used to gain insight on select files in the body of files known to the system.

Figure 2:
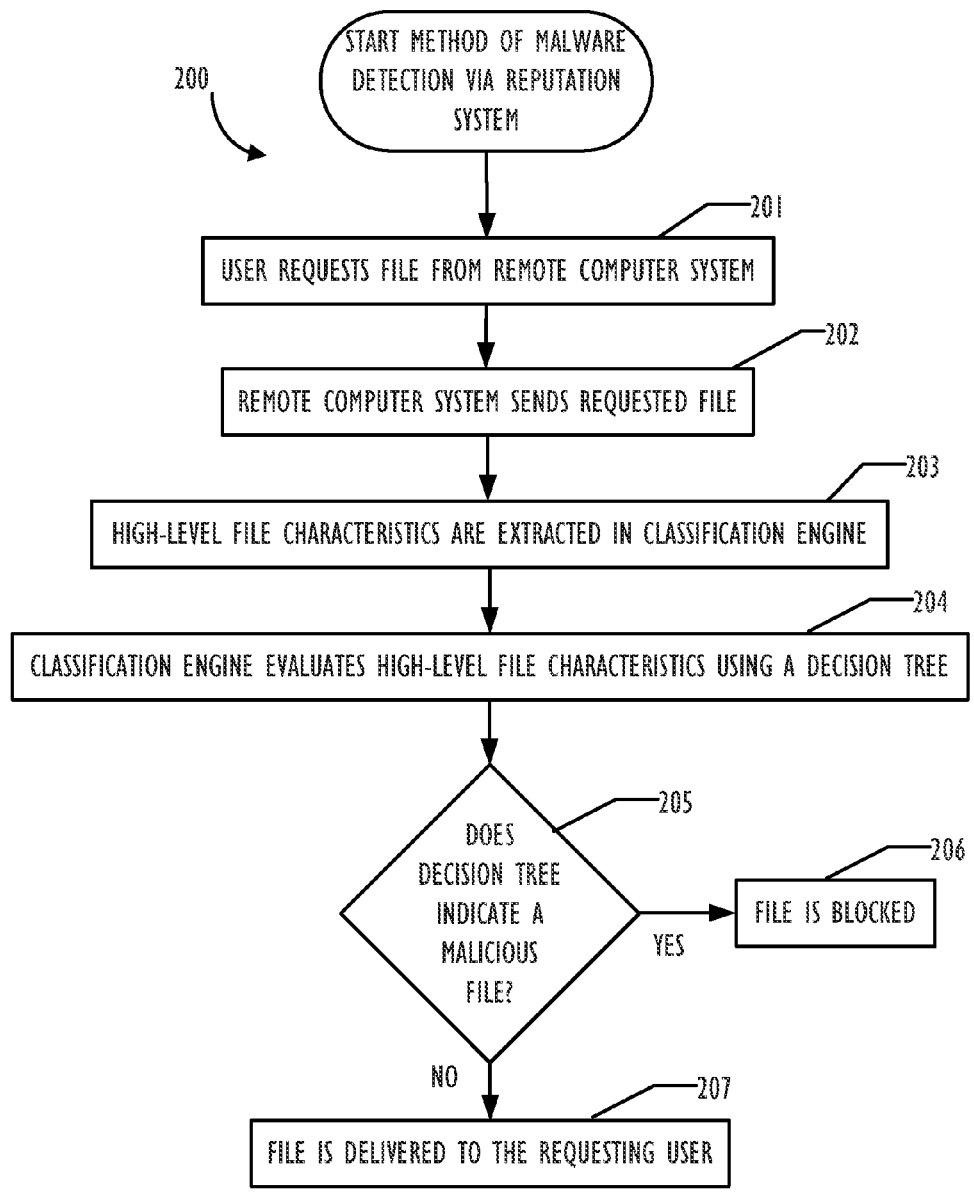
FIG. 2 is a flowchart illustrating use of high-level file characteristics and a decision tree classification engine to determine whether a file is malware, consistent with an example embodiment of the invention.

FIG. 2 is a flowchart of an example method of using high-level characteristics of a file to determine whether it is benign or malware, consistent with an example embodiment of the invention. At 201, a user such as a computer 101 from FIG. 1 requests a file from a remote computer system, such as by downloading an executable file from an Internet website. The remote computer receives the file request and sends the file at 202, and the file is received in a gateway or endpoint classification engine operable to evaluate the file to determine whether the file is malware or is benign.

High level file characteristics are extracted from the file at 203, and the classification engine uses these high level characteristics and decision tree rules at 204, such as by using file geometry, randomness, size, starting code string data, hash values of various file data, or other such characteristics to determine whether the file has similar traits as known malicious files at 205.

If the file in question matches a decision tree rule indicating that it is a malicious file, the file is blocked at 206. Because rules resulting in a finding of a benign file are truncated from the decision tree in some embodiments, files that reach the end of a branch of the decision tree without being found malicious are presumed to be benign, and the file is delivered to the requesting user at 207.

This new classification technique using extracted high level features applied to a decision tree will have multiple advantages over traditional signature-based inspection methods. First, the method works proactively in that it works on high-level traits of a sample in contrast to low-level descriptions, enabling detection of more new or unknown threats before detailed data is available to increase the level of protection provided to customers. Second, a large number of potential malware files can be represented in an extremely compact fashion, reducing the overall size of the definitions data file. Third, the features extracted from a malware file can be used to gather global intelligence on malware, improving both the efficiency of a backend data classification system and improving the efficiency of models distributed to endpoints or gateways. This data is further correlated with email or web data in a consolidated server lookup including IP reputation data in some embodiments, which will further improve intelligence capabilities. Fourth, the technique proposed is general and will benefit all levels of malware detection (end host, gateway, backend, and online queries).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of filtering digital electronic content, comprising:
   accessing a digital file;
   extracting a plurality of high level features from the digital file;
   evaluating the plurality of high level features using a classifier on a first computer system to make an initial determination of whether the digital file is benign or malicious, the classifier on the first computer system using a first classification model;
   sending a hash of the digital file over a network to a reputation server computerized system for the reputation server to make a secondary determination of whether the digital file is benign or malicious, the secondary determination using a second classification model, wherein the reputation server tracks one or more characteristics of the hash of the digital file, the one or more characteristics comprising query volume per hash, time since first appearance of the hash, number of clients querying the hash, and distribution of clients querying the hash; and
   receiving at the first computer system from the reputation server an indication of the secondary determination, wherein the secondary determination is made after the initial determination, wherein the first classification model has a higher false positive rate than the second classification model.

2. The method of filtering digital electronic content of claim 1, wherein the reputation server secondary determination as to whether the digital file is benign or malicious comprises at least one of determining the digital file is malicious if the hash matches a known malicious file, and determining the digital file is malicious if the hash does not match a known benign file.

3. The method of filtering digital electronic content of claim 1, wherein the classifier comprises one or more decision trees.

4. The method of filtering digital electronic content of claim 1, wherein the plurality of high level features comprise at least one of file size, file randomness, starting code string, and file geometry.

5. The method of filtering digital electronic content of claim 1, further comprising evaluating the digital file using behavioral data extracted from run-time properties of the digital file to determine whether the digital file is benign or malicious.

6. The method of filtering digital electronic content of claim 1, wherein evaluating comprises determining at least one of libraries or resources used by the digital file.

7. The method of filtering digital electronic content of claim 1, wherein at least one of the extracting and evaluating is implemented in one or more of a client computer, a gateway device, a backend server, and a real-time in-the-cloud classification system.

8. The method of filtering digital electronic content of claim 1, further comprising forwarding the digital file to a requesting computer if the digital file is determined to be benign, and blocking delivery of the digital file if the digital file is determined to be malicious.

9. The method of filtering digital electronic content of claim 1, wherein evaluating comprises forwarding high level features of the digital file to the reputation server for the secondary determination and blocking only files determined malicious by the reputation server.

10. A computer network device, comprising:
a network connection operable to access a digital file;
an extraction module operable to extract a plurality of high level features from the digital file; and
an evaluation module operable to evaluate the plurality of high level features using a classifier to make an initial determination of whether the digital file is benign or malicious, the classifier using a first classification model;
a transmission function operable to send a hash of the digital file over the network connection to a reputation server computerized system for the reputation server to make a secondary determination of whether the digital file is benign or malicious, the secondary determination using a second classification model, wherein the reputation server tracks one or more characteristics of the hash of the digital file, the one or more characteristics comprising query volume per hash, time since first appearance of the hash, number of clients querying the hash, and distribution of clients querying the hash; and
a reception function operable to receive from the reputation server an indication of the secondary determination, wherein the secondary determination is made after the initial determination,
wherein the first classification model has a higher false positive rate than the second classification model.

11. The computer network device of claim 10, wherein the classifier comprises a decision tree.

12. The computer network device of claim 10, wherein the plurality of high level features comprise at least one of file size, file randomness, starting code string, and file geometry.

13. The computer network device of claim 10, wherein the evaluation module further operable to evaluate the binary file using behavioral data extracted from run-time properties of the digital file to determine whether the digital file is benign or malicious.

14. The computer network device of claim 10, wherein the evaluation module is further operable to determine at least one of libraries or resources used by the digital file.

15. The computer network device of claim 10, wherein the device comprises one or more of a client computer, a gateway device, a backend server, and a real-time cloud classification system.

16. The computer network device of claim 10, wherein the evaluation module is further operable to forward the digital file to a requesting computer if the digital file is determined to be benign, and to block file delivery if the digital file is determined to be malicious.

17. The computer network device of claim 10, wherein the evaluation module is further operable to:
block only digital files determined malicious by the reputation server.

18. A non-transitory machine-readable medium with instructions stored thereon, the instructions when executed operable to cause a computerized system to:
access a digital file;
extract a plurality of high level features from the digital file; and
evaluate the plurality of high level features using a classifier on a first computer system to make an initial determination of whether the digital file is benign or malicious, the classifier on the first computer system using a first classification model;
send a hash of the digital file over a network to a reputation server computerized system for the reputation server to make a secondary determination of whether the digital file is benign or malicious, the secondary determination using a second classification model, wherein the reputation server tracks one or more characteristics of the hash of the digital file, the one or more characteristics comprising query volume per hash, time since first appearance of the hash, number of clients querying the hash, and distribution of clients querying the hash; and
receive at the first computer system from the reputation server an indication of the secondary determination, wherein the secondary determination is made after the initial determination,
wherein the first classification model has a higher false positive rate than the second classification model.

19. The non-transitory machine-readable medium of claim 18, wherein the classifier comprises a decision tree.

20. The non-transitory machine-readable medium of claim 18, wherein the plurality of high level features comprise at least one of file size, file randomness, starting code string, and file geometry.

21. The non-transitory machine-readable medium of claim 18, wherein the instructions when executed further operable to evaluate the digital file using behavioral data extracted from runtime properties of the digital file to determine whether the digital file is benign or malicious.

22. The non-transitory machine-readable medium of claim 18, wherein evaluating comprises determining at least one of libraries or resources used by the digital file.

23. The non-transitory machine-readable medium of claim 18, wherein at least one of the extracting and evaluating is implemented in one or more of a client computer, a gateway device, a backend server, and a real-time cloud classification system.

24. The non-transitory machine-readable medium of claim 18, wherein the instructions when executed further operable to forward the digital file to a requesting computer if the digital file is determined to be benign, and blocking file delivery if the digital file is determined to be malicious.

25. The non-transitory machine-readable medium of claim 18, wherein evaluating the plurality of high level features comprises blocking only those digital files determined malicious by the reputation server.

\* \* \* \* \*